(12) United States Patent
McLoone et al.

(10) Patent No.: US 7,345,674 B2
(45) Date of Patent: *Mar. 18, 2008

(54) COMPUTER INPUT DEVICE WITH DIGIT SUPPORT AND NATURAL POSITION ACTUATORS

(75) Inventors: Hugh E. McLoone, Bellevue, WA (US); Steven W. Fisher, Edmonds, WA (US); Carl J. Ledbetter, Lynnwood, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/134,109

(22) Filed: May 20, 2005

(65) Prior Publication Data

US 2005/0206619 A1    Sep. 22, 2005

Related U.S. Application Data

(62) Division of application No. 09/286,739, filed on Apr. 6, 1999, now Pat. No. 7,002,552.

(51) Int. Cl.
*G09G 5/08* (2006.01)

(52) U.S. Cl. ...................... 345/163; 345/167

(58) Field of Classification Search ........ 345/156–167, 345/184; D14/402, 417
See application file for complete search history.

(56) References Cited

U.S. PATENT DOCUMENTS

| D288,569 S | 3/1987 | Ida ...................... D14/114 |
| 4,862,165 A | 8/1989 | Gart ..................... 341/20 |
| 4,891,632 A | 1/1990 | Chang .................. 340/710 |
| D328,597 S | 8/1992 | Clouss ................. D14/114 |
| 5,157,381 A | 10/1992 | Cheng ................. 340/710 |
| 5,157,384 A | 10/1992 | Greanias et al. ....... 340/706 |
| D330,706 S | 11/1992 | San-Yih ............... D14/114 |
| D331,231 S | 11/1992 | Yang ................... D14/114 |
| D336,900 S | 6/1993 | Pfeifer ................. D14/114 |
| D337,321 S | 7/1993 | Koh et al. ............. D14/114 |
| 5,252,970 A | 10/1993 | Baronowsky ........... 341/20 |

(Continued)

FOREIGN PATENT DOCUMENTS

CA    2213954    2/1999

(Continued)

OTHER PUBLICATIONS

Bryne, Jason, "Unleash the mighty Super Mouse for digital control of numbers and text", Government Computer News, vol. 16, No. 4, 2 pages (Feb. 24, 1997).

(Continued)

*Primary Examiner*—Regina Liang
(74) *Attorney, Agent, or Firm*—Theodore M. Magee; Westman, Champlin & Kelly, P.A.

(57) ABSTRACT

A mouse has sufficient width to support the distal phalanges of a user's ring finger and little finger while the user's middle finger is positioned over a secondary button of the mouse. The mouse also provides at least one side button positioned so that it is not contacted by the user's thumb during "pinching" of the mouse but is easily accessible by the user's thumb. In addition, the mouse provides a wheel with a large number of ribs that increase friction between the user's finger and the wheel.

6 Claims, 6 Drawing Sheets

U.S. PATENT DOCUMENTS

| | | | | |
|---|---|---|---|---|
| D340,923 S | 11/1993 | Tso | | D14/114 |
| D340,926 S | 11/1993 | Lin | | D14/114 |
| D343,392 S | 1/1994 | Harden et al. | | D14/114 |
| D344,498 S | 2/1994 | Leman | | D14/114 |
| 5,287,090 A | 2/1994 | Grant | | 345/163 |
| 5,287,120 A | 2/1994 | Okada et al. | | 345/163 |
| 5,298,919 A | 3/1994 | Chang | | 345/163 |
| D346,373 S | 4/1994 | Grant | | D14/114 |
| 5,313,230 A | 5/1994 | Venolia et al. | | D14/114 |
| D348,057 S | 6/1994 | Bradley | | D14/114 |
| 5,374,942 A | 12/1994 | Gilligan et al. | | 345/157 |
| D354,484 S | 1/1995 | Skaggs | | D14/114 |
| D355,901 S | 2/1995 | Bradley | | D14/114 |
| D356,558 S | 3/1995 | Montgomery et al. | | D14/114 |
| 5,428,368 A | 6/1995 | Grant | | 345/163 |
| D362,431 S | 9/1995 | Kaneko et al. | | D14/114 |
| D363,712 S | 10/1995 | Yamada | | D14/114 |
| 5,473,344 A | 12/1995 | Bacon et al. | | 345/163 |
| D368,080 S | 3/1996 | Aeschbacher et al. | | D14/114 |
| D368,900 S | 4/1996 | Ma | | D14/114 |
| D369,593 S | 5/1996 | Ma | | D14/114 |
| 5,530,455 A | 6/1996 | Gillick et al. | | 345/163 |
| D371,771 S | 7/1996 | Verstockt | | D14/114 |
| D372,904 S | 8/1996 | Lo | | D14/114 |
| D373,999 S | 9/1996 | Staats | | D14/114 |
| 5,576,733 A | 11/1996 | Lo | | 345/163 |
| D377,487 S | 1/1997 | Shih et al. | | D14/114 |
| D378,086 S | 2/1997 | Sheehan et al. | | D14/114 |
| 5,635,958 A | 6/1997 | Murai et al. | | 345/168 |
| D381,014 S | 7/1997 | Kraus et al. | | D14/114 |
| D381,968 S | 8/1997 | Edwards et al. | | D14/114 |
| D381,969 S | 8/1997 | Ratzlaff | | D14/114 |
| D381,970 S | 8/1997 | Gasca | | D14/114 |
| D381,971 S | 8/1997 | Wu | | D14/114 |
| D382,550 S | 8/1997 | Kaneko et al. | | D14/114 |
| 5,657,051 A | 8/1997 | Liao | | 345/163 |
| 5,661,504 A | 8/1997 | Lo | | 345/164 |
| D385,542 S | 10/1997 | Kaneko et al. | | D14/114 |
| D385,861 S | 11/1997 | Lin | | D14/114 |
| 5,764,227 A | 6/1998 | Ishimine | | 345/344 |
| 5,784,052 A | 7/1998 | Keyson | | 345/167 |
| 5,805,144 A | 9/1998 | Scholder et al. | | 345/163 |
| 5,828,364 A | 10/1998 | Siddiqui | | 345/163 |
| 5,841,425 A | 11/1998 | Zenz, Sr. | | 345/163 |
| 5,854,624 A | 12/1998 | Grant | | 345/169 |
| 5,883,619 A | 3/1999 | Ho et al. | | 345/163 |
| 5,917,472 A | 6/1999 | Perala | | 345/163 |
| 5,937,419 A | 8/1999 | Oshiro et al. | | 707/514 |
| 6,005,553 A | 12/1999 | Goldstein et al. | | 345/163 |
| 6,031,518 A | 2/2000 | Adams et al. | | 345/156 |
| 6,031,522 A | 2/2000 | Strand | | 345/163 |
| 6,072,471 A | 6/2000 | Lo | | 345/163 |
| 6,097,371 A | 8/2000 | Siddiqui et al. | | 345/164 |
| 6,124,846 A | 9/2000 | Goldstein et al. | | 345/163 |
| 6,128,006 A | 10/2000 | Rosenberg et al. | | 345/163 |
| 6,144,372 A | 11/2000 | Chen | | 345/184 |
| 6,163,616 A | 12/2000 | Feldman | | 382/115 |
| 6,166,723 A | 12/2000 | Schena et al. | | 345/184 |
| D436,961 S | 1/2001 | Ledbetter | | |
| D437,853 S | 2/2001 | Ledbetter | | |
| 6,198,473 B1 | 3/2001 | Armstrong | | 345/163 |
| D442,592 S | 5/2001 | Ledbetter | | |
| D443,616 S | 6/2001 | Fisher | | |
| 6,256,013 B1 | 7/2001 | Siddiqui | | 345/163 |
| 6,281,882 B1 | 8/2001 | Gordon et al. | | 345/166 |
| 6,300,936 B1 | 10/2001 | Braun et al. | | 345/156 |
| 6,353,429 B1 | 3/2002 | Long | | 345/163 |
| 6,362,811 B1 | 3/2002 | Edwards et al. | | 345/163 |
| 6,417,843 B1 | 7/2002 | Stephens et al. | | 345/167 |
| 2002/0054023 A1 | 5/2002 | Adan et al. | | 345/163 |

FOREIGN PATENT DOCUMENTS

| | | |
|---|---|---|
| DE | 198 39 390 | 3/2000 |
| EP | 0394 614 A | 1/1990 |
| EP | 0 721 170 | 7/1996 |
| EP | 0 901 094 | 3/1999 |
| FR | 2 698 986 | 6/1994 |
| GB | 2 321 692 A | 1/1997 |
| JP | 63 282827 | 11/1988 |
| JP | 8-263202 | 10/1996 |
| WO | WO 92/14235 | 8/1992 |
| WO | WO 97 48066 A | 6/1997 |

OTHER PUBLICATIONS

Office Action (Oct. 1, 2004) and copy of an Election and Amendment (Nov. 1, 2004) from U.S. Appl. No. 10/004,663, filed Dec. 4, 2001.

The Notification of Transmittal of the International Preliminary Examination Report for PCT/US00/08658 filed Mar. 31, 2000.

All Office Actions and Responses from U.S. Appl. No. 09/286,739, filed Apr. 6, 1999 (Office Actions (Apr. 25, 2005, Oct. 22, 2002, May 8, 2002, Nov. 6, 2001, May 23, 2001, Dec. 21, 2000); Responses (May 12, 2005, May 21, 2003, Dec. 23, 2002, Aug. 8, 2002, Aug. 23, 2001, Feb. 26, 2001; Preliminary Amendment (Sep. 20, 2000).

Rubel, Malcolm C., "Program mouse events into your dBASE apps.", Data Based Advisor, vol. 10, No. 10, 4 pages (Oct. 1992).

Assmann Data Products, "*Digitus Magic Click Mouse Data Sheet*", Nov. 29, 1994.

Interex Computer Products, "*PC Input Devices Data Sheet*", Nov. 1994.

Ben Shneiderman et al., "*Designing to Facilitate Browsing: A Look Back at the Hyperties Workstation Browser*", Hypermedia, vol. 3 No. 2, 1991, pp. 101-117.

Pending U.S. Appl. No. 29/080,840, filed Nov. 26, 1997, Kaneko et al.

Pending U.S. Appl. No. 29/083,068, filed Feb. 4, 1998, Kaneko et al.

Internet Site, "http://www.a4tech.com.tw/2d.html", "http://www.a4tech.com.tw/3d.html", http://www.a4tech.com.tw/4d/html, "http://www.a4tech.com.tw/4d_track.htm", and "http://www.a4tech.com.tw/4dplus.html", Nov. 13, 1998.

WACOM Intuos Accessories, printed from http://www.wacom.com/productinfo/accessories.html, three pages (1998).

U.S. Appl. No. 09/988,305, filed Dec. 2001, Adan et al.

Pending U.S. Appl. No. 09/153,148, filed Sep. 14, 1998, Adan et al.

U.S. Appl. No. 29/102,986, filed Apr. 6, 1999, Ledbetter.

U.S. Appl. No. 29/102,989, filed Apr. 6, 1999, Ledbetter.

COMPUTER INPUT DEVICE WITH DIGIT SUPPORT AND NATURAL POSITION ACTUATORS

REFERENCE TO RELATED APPLICATIONS

This application is a divisional of and claims priority from U.S. patent application Ser. No. 09/286,739, filed on Apr. 6, 1999 now U.S. Pat. No. 7,002,552 and entitled COMPUTER INPUT DEVICE WITH DIGIT SUPPORT AND NATURAL POSITION ACTUATORS, which is hereby incorporated by reference.

BACKGROUND

With the growing popularity of graphical computer interfaces such as the interface provided by Windows 98® from Microsoft Corporation of Redmond, Wash., computer mice have become an important tool for interacting with computers. Even so, little work has been done to investigate how to improve mice to minimize user hand fatigue while maximizing user accuracy in positioning a cursor on the screen.

For example, current computer mice do not provide enough support to the little finger and ring fingers of computer users. In particular, there are no mice of the prior art that provide vertical support to the distal phalanges (i.e., finger tips) of a user's ring finger and little finger when the user has their index finger and their middle finger positioned over the primary and secondary mouse buttons, respectively. Instead, when a user grasps a mouse with their middle finger positioned over the secondary button, their ring finger is used to "pinch" the substantially vertical sides of the mouse and their little finger is left to drag across the work surface.

Some mice of the prior art provide support for the ring finger, but only if the user positions the ring finger over the secondary button. In most cases, this positioning causes the user to flex both their middle finger and their ring finger to actuate the secondary button.

Because of the increasing importance of mice, manufactures have recently begun to add more actuators to their mice. In particular, manufacturers have added actuators on the sides of their mice. These actuators take the form of side buttons that are depressed by the user's thumb. Current designs for such side buttons have emphasized placing the side button directly under the user's thumb, much like the top buttons are positioned beneath the user's fingers. Although this natural design makes it easy to actuate the button, it interferes with "pinching" the mouse during mouse movements.

Mice manufacturers have also begun to include depressible and rotatable wheels on the top of their mice to perform scrolling functions. The surface of such wheels have generally been smooth or populated by widely spaced bumps or ridges. Although such designs have provided adequate performance, they do not provide an optimal amount of surface friction for rolling.

Thus, an improved mouse is needed that provides support to the user's hand and fingers while allowing pinching of the mouse and actuation of the buttons of the mouse. In addition, a mouse wheel is needed with improved friction between the user's finger and the wheel.

SUMMARY

A mouse has sufficient width to support the distal phalanges of a user's ring finger and little finger while the user's middle finger is positioned over a secondary button of the mouse. The mouse also provides at least one side button positioned so that it is not contacted by the user's thumb during "pinching" of the mouse but is easily accessible by the user's thumb. In addition, the mouse provides a wheel with a large number of ribs that increase friction between the user's finger and the wheel.

DETAILED DESCRIPTION

Figure 1:
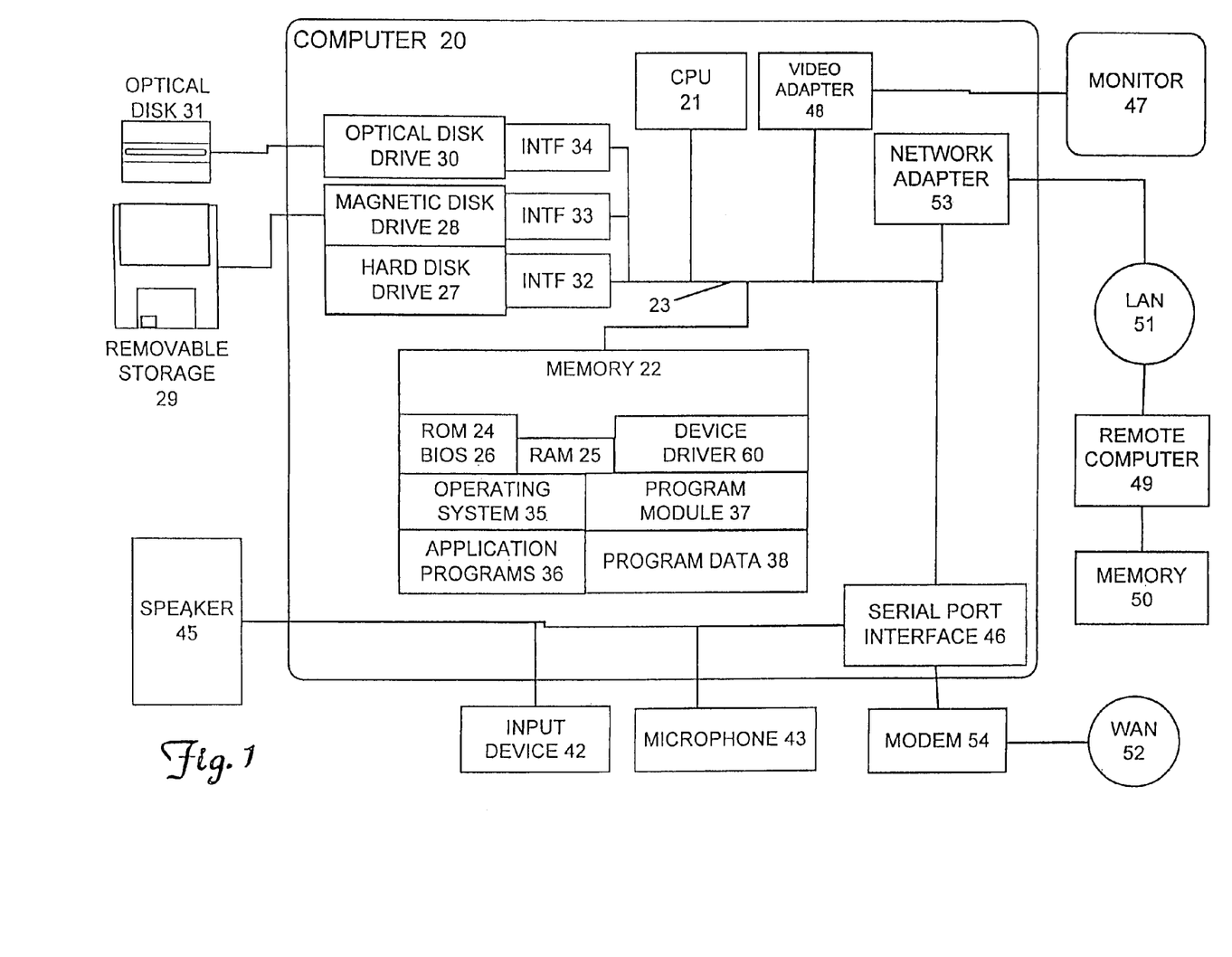
FIG. 1 is a plan view of a general computing environment for embodiments of the present invention.

FIG. 1 and the related discussion are intended to provide a brief, general description of a suitable computing environment in which embodiments of the invention may be implemented. Although not required, embodiments of the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that embodiments of the invention may be practiced with other computer system configurations, including hand-held devices, multiprocessor systems, microprocessor-based or programmable consumer electronics, network PCs, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing embodiments of the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 2:
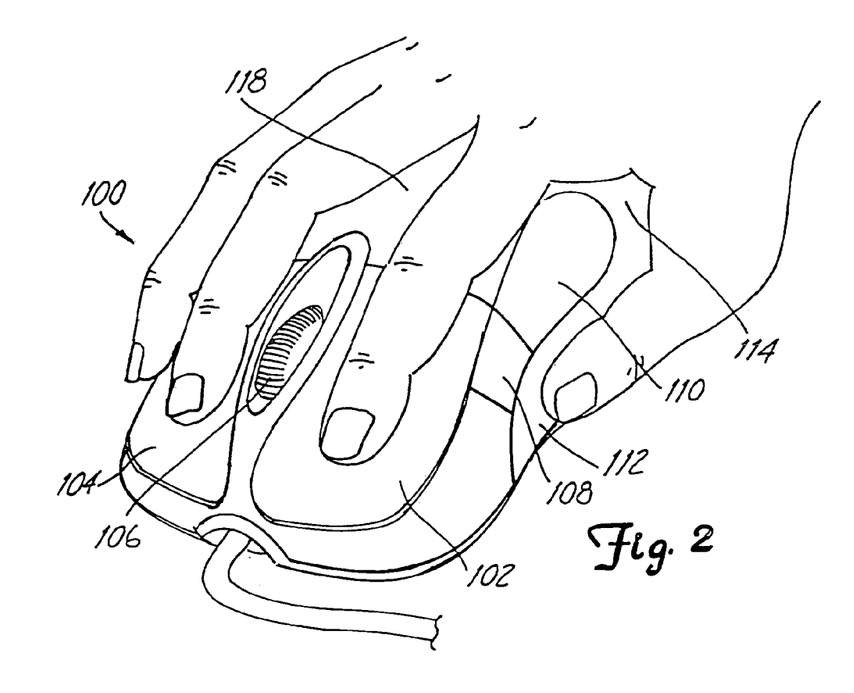
FIG. 2 is a perspective view of a mouse of one embodiment of the present invention with a hand shown gripping the mouse.
Figure 3:
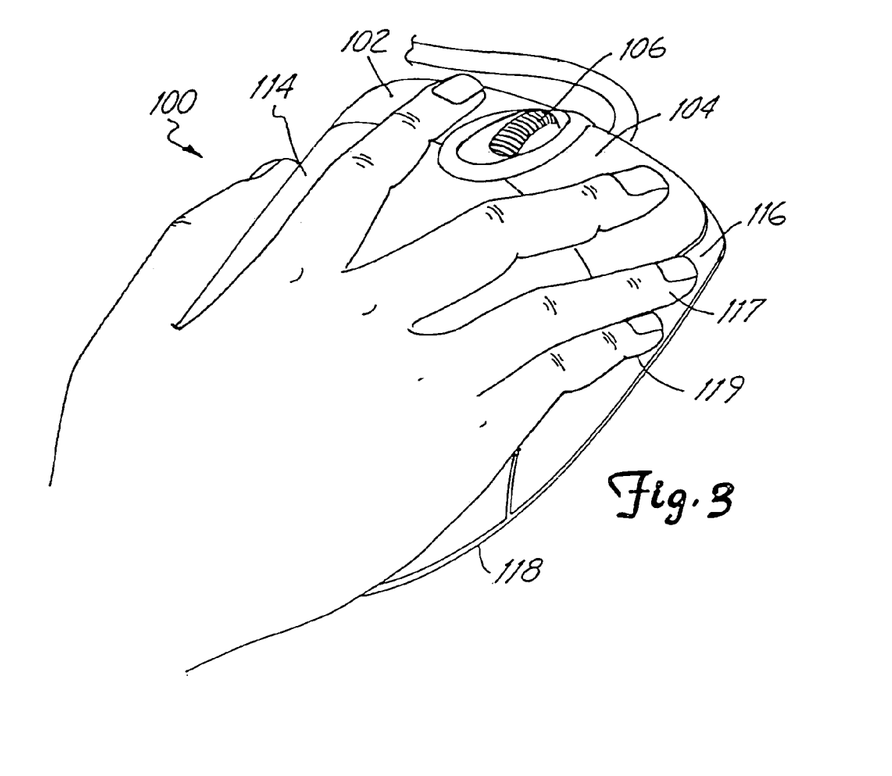
FIG. 3 is a second perspective view of a mouse of one embodiment of the present invention with a hand shown gripping the mouse.

In embodiments of the present invention, pointing device 42 is a mouse such as mouse 100 of FIGS. 2 through 7. FIG. 2 provides a perspective view of mouse 100 with a user's hand superimposed over the mouse to show the general alignment of the mouse's features with the user's hand. FIG. 3 provides a rear perspective view of mouse 100 also with a user's hand superimposed over the mouse.

In FIGS. 2 and 3, mouse 100 includes a primary button 102, a secondary button 104, and a depressible and rotatable wheel 106. For the buttons and the depressible wheel, respective switches connected to the buttons and wheel are closed when the button or wheel is depressed. In one embodiment, the outer surface of wheel 106 is made of an elastomeric material such as Santoprene or Krayton.

Mouse 100 also includes a casing 118 having a metacarpophalangeal ridge (MCPR) support 114 that extends under the metacarpophalangeal ridge of the user's hand from the index finger to the little finger. As a general definition, the metacarpophalangeal ridge is the junction between the metacarpal bones of the hand and the proximal phalanges of the fingers.

In FIG. 2, mouse 100 can also be seen to include a forward side button 108 a rear side button 110, and a thumb "pinching" area 112 located beneath side buttons 108 and 110. FIG. 3 shows that mouse 100 also includes a support slope 116 that provides a sloping surface to support the respective distal phalanges 117 and 119 of the ring finger and little finger of the user while the user's middle finger is positioned over secondary button 104. Note that in prior art mice, the right side of the mouse does not slope but instead is substantially vertical. This makes many prior art mice easier to lift but provides no vertical support for the distal phalanges of the ring and little finger of the user.

Figure 4:
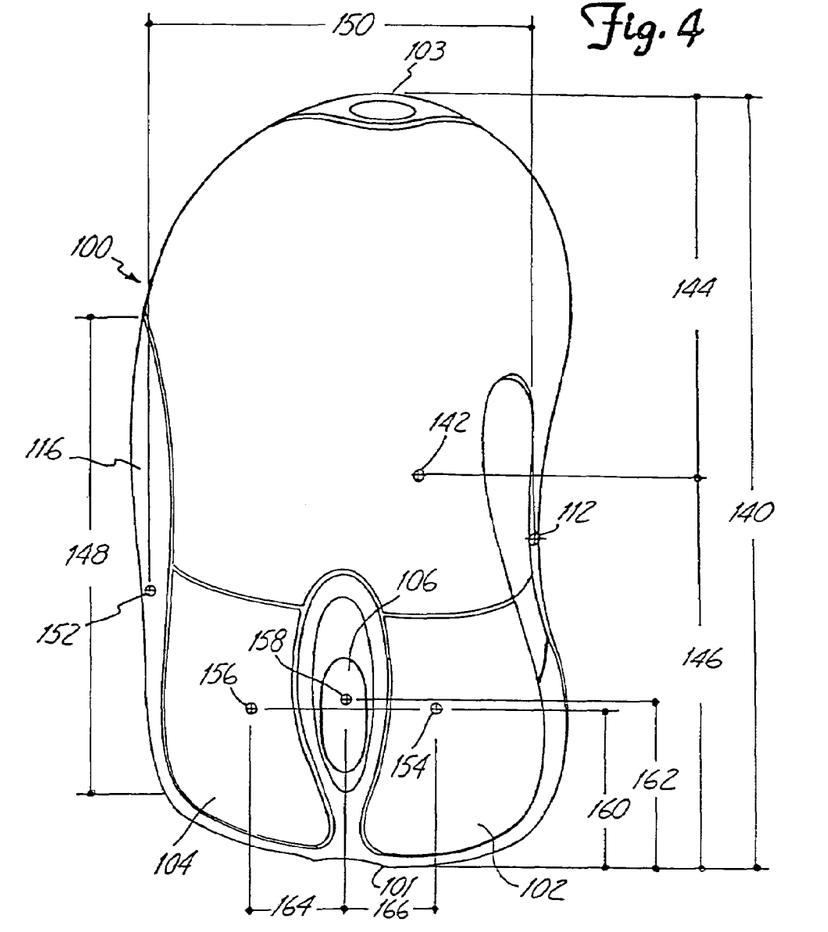
FIG. 4 is a top view of a mouse of one embodiment of the present invention.

FIG. 4 provides a top view of mouse 100 showing several dimensions and locations of interest to embodiments of the present invention. In FIG. 4, mouse 100 has a length 140 of between about 4.5 inches (11.43 cm) and about 5.5 inches (13.97 cm) with one embodiment having a length 140 of about 5.24 inches (13.30 cm). Casing 118 slopes upward from a front 101 and a back 103 to a high point 142 located a distance 144 from back 103 and a distance 146 from front 101. In embodiments of the invention, distance 144 is between about 2.25 inches (5.71 cm) and about 2.75 inches (6.98 cm) and in one embodiment is about 2.58 inches (6.55 cm). Distance 146 is between about 2.25 inches (5.71 cm) and about 2.75 inches (6.98 cm) and in one embodiment is about 2.66 inches (6.75 cm).

Support slope 116 has a length 148 of between about 2.8 inches (7.11 cm) and about 3.4 inches (8.63 cm), and in one embodiment has a length 148 of about 3.26 inches (8.28 cm). Mouse 100 has a concave shape at thumb pinching region 112 to insure that the user's thumb engages mouse 100 from a neutral position or a position nearer to the palm of the hand than the thumb's neutral position. In this context, the neutral position for the user's hand or any of the user's digits is the position where flexors and extensors of the user's hand are in equilibrium and static loads on forearm muscles are small relative to normal loads associated with gripping objects. The inventors have determined that the concave shape of the thumb pinching area shown in FIG. 4 places less stress on the user's hand during mouse pinching.

A pinching width 150 is defined from thumb pinching region 112 to a ring finger contact point 152 on support slope 116, where contact point 152 is the average point at which the distal phalanx of a user's ring finger makes contact with support slope 116 during pinching. This average point is based on hand sizes ranging from a North American women's 5th percentile, which represents women with small hands relative to other women, to a North American men's 95th percentile, which represents men with large hands relative to other men. Specifically, it is the point where a hand equal to the mean hand size for North American adults contacts the mouse. In this context, the mean hand size for North American adults is about 7.2 inches (18.29 cm) from the wrist to the end of the middle finger. In the several embodiments of the invention, pinching width 150 is between about 2.25 inches (5.715 cm) and about 2.95 inches (7.493 cm) and in one embodiment is about 2.6 inches (6.604 cm).

Primary button 102, secondary button 104 and wheel 106 have average contact points 154, 156, and 158, respectively. For primary button 102 and wheel 106, average contact points 154 and 158 represent the points where the distal phalanx of the average user's index finger contacts the button or wheel, respectively. For secondary button 104, average contact point 156 represents the point where the distal phalanx of the average hand's middle finger contacts secondary button 104. Contact points 154 and 156 are a distance 160 from front 101 of mouse 100. Contact point 158 is a distance 162 from the front 101. In one embodiment, distance 160 is about 1.06 inches (2.69 cm) and distance 162 is about 1.12 inches (2.84 cm).

Figure 5:
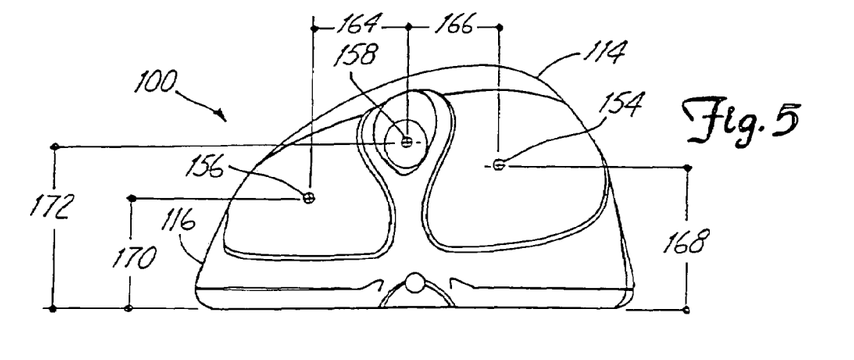
FIG. 5 is a front view of a mouse of one embodiment of the present invention.

As shown in the front view of FIG. 5, contact point 158 is separated from contact point 156 by a distance 164 and from contact point 154 by a distance 166. In one embodiment, distances 164 and 166 are both about 0.63 inches (1.60 cm). Contact points 154, 156, and 158 are elevated from the working surface by distances 168, 170, and 172, respectively. In the several embodiments of the invention, distance 168 is within a range of about 1.1 inches (2.79 cm) to about 1.4 inches (3.55 cm) and distance 170 is within a range of about 1.0 inches (2.54 cm) to about 2.0 inches (5.08 cm). In one embodiment distances 168, 170, and 172 are about 1.24 inches (3.14 cm), about 1.0 inches (2.54 cm) and about 1.31 inches (3.32 cm) respectively. Note that buttons 102 and 104 may be depressed by contacting any point on the button, and the contact points discussed above represent the points where the fingers of an average hand are most likely to contact the mouse.

Figure 6:
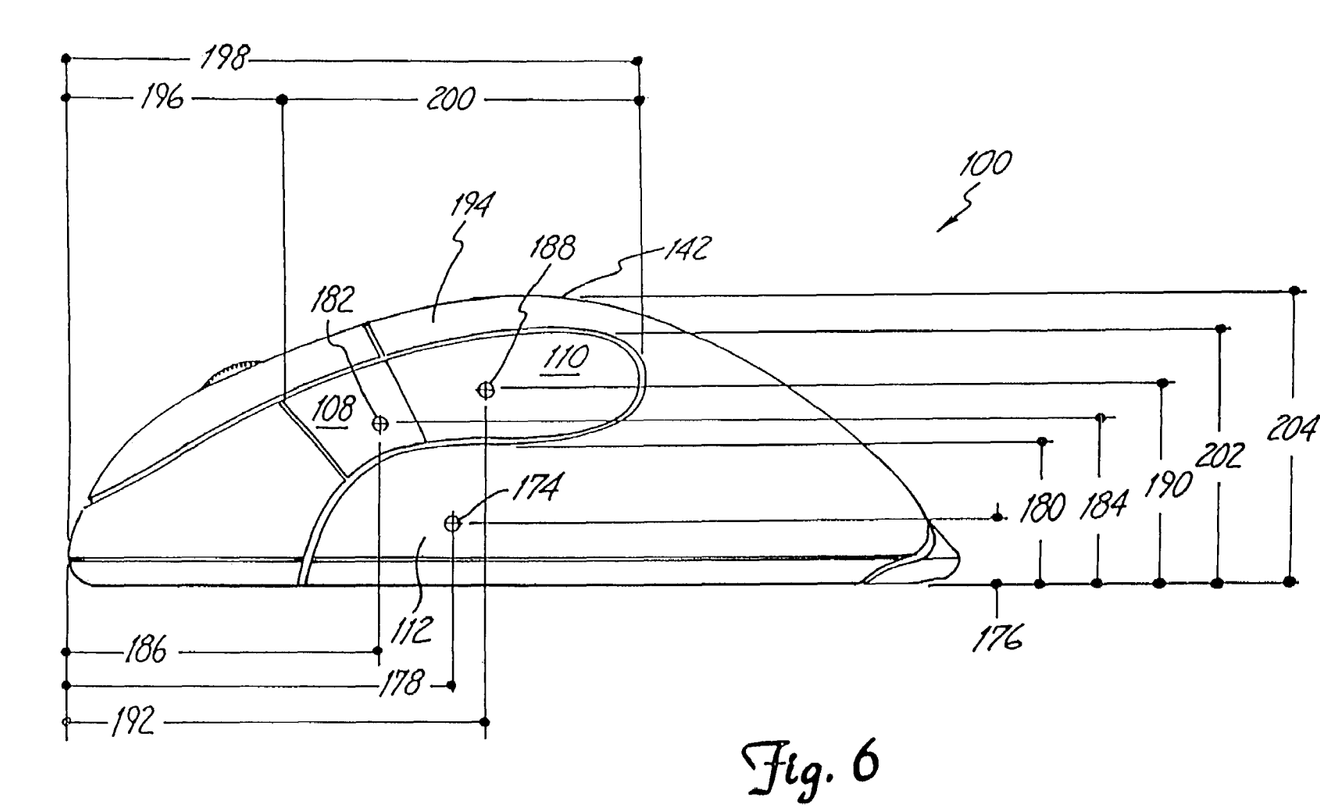
FIG. 6 is a side view of a mouse of one embodiment of the present invention.

FIG. 6 is a side view of the thumb side of mouse 100. In FIG. 6 a thumb contact point 174 is shown in thumb pinching area 112. Thumb contact point 174 is the average contact point for the distal phalanx of a user's thumb while pinching mouse 100. In FIG. 6, thumb contact point 174 is located a height 176 above the working surface and is a distance 178 from the front of mouse 100. In one embodiment of the invention, height 176 is about 0.44 inches (1.12 cm) and distance 178 is about 2.25 inches (5.71 cm). Height 176 is chosen such that the side of the distal phalanx of the user's thumb is does not contact the working surface.

Note that point 174 is below side buttons 108 and 110. This allows the user to pinch mouse 100 without the risk of actuating either side button. In fact, the bottom of button 110 is located a height 180 from the working surface to provide sufficient clearance for the users entire thumb in pinching area 112 so that the user's thumb does not contact button 110 when the distal phalanx of the thumb is in pinching area 112. In the several embodiments of the invention, height 180 is in the range from about 0.69 inches (1.75 cm) to about 1.8 inches (4.57 cm) and in one embodiment is about 0.79 inches (2.00 cm).

Button 108 of FIG. 6 includes a contact point 182 where the average user's hand contacts button 108 to actuate the button. Contact point 182 is located a height 184 from the working surface and a distance 186 from front 101 of mouse 100. In the several embodiments of the present invention, height 184 is in a range from about 0.85 inches (2.16 cm) to about 1.15 inches (2.92 cm). In one embodiment, height 184 is about 0.95 inches (2.41 cm) and distance 186 is about 1.78 inches (4.54 cm).

Button 110 includes a contact point 188 located a height 190 from the working surface and a distance 192 from front 101. In some embodiments, height 190 is in a range of about 1.03 inches (2.62 cm) to about 1.33 inches (3.38 cm). In one embodiment, height 190 is about 1.13 inches (2.87 cm) and distance 192 is about 1.927 inches (4.89 cm).

Button 108 and 110 together form a button shape 194, also referred to as a shaped button assembly, that is contoured to substantially fit or conform to the natural space between a user's index finger and their thumb when their index finger is positioned on contact point 154 of FIG. 5 and their thumb is positioned on contact point 174 of FIG. 6. The front of button 108 is located a distance 196 from the front of mouse 100 and the back of button 110 is located a distance 198 from the front of mouse 100, providing a length 200 for button area 194. In embodiments of the invention, distance 198 is between about 2.05 inches (5.21 cm) and about 4.05 inches (10.29 cm) and distance 200 is between about 0.8 inches (2.03 cm) and about 2.8 inches (7.11 cm). In one embodiment, distances 196, 198 and 200 are about 1.25 inches (3.17 cm), about 3.37 inches (8.56 cm), and about 2.12 inches (5.38 cm) respectively.

Button 110 has a button height that extends from a lower edge at height 180 to an upper edge at a height 202. In several embodiments, height 202 is in the range of about 1.4 inches (3.56 cm) to about 1.9 inches (4.83 cm). In one embodiment, height 202 is about 1.5 inches (3.81 cm) and height 180 is about 0.788 inches (2.00 cm) providing a button height for button 110 of about 0.712 inches (1.81 cm).

FIG. 6 also shows that highpoint 142 of metacarpophalangeal ridge support 114 is at a height 204 from the working surface. Height 204 is between about 1.6 inches (4.06 cm) and about 1.9 inches (4.83 cm) and in one embodiment is about 1.7 inches (4.32 cm).

Figure 7:
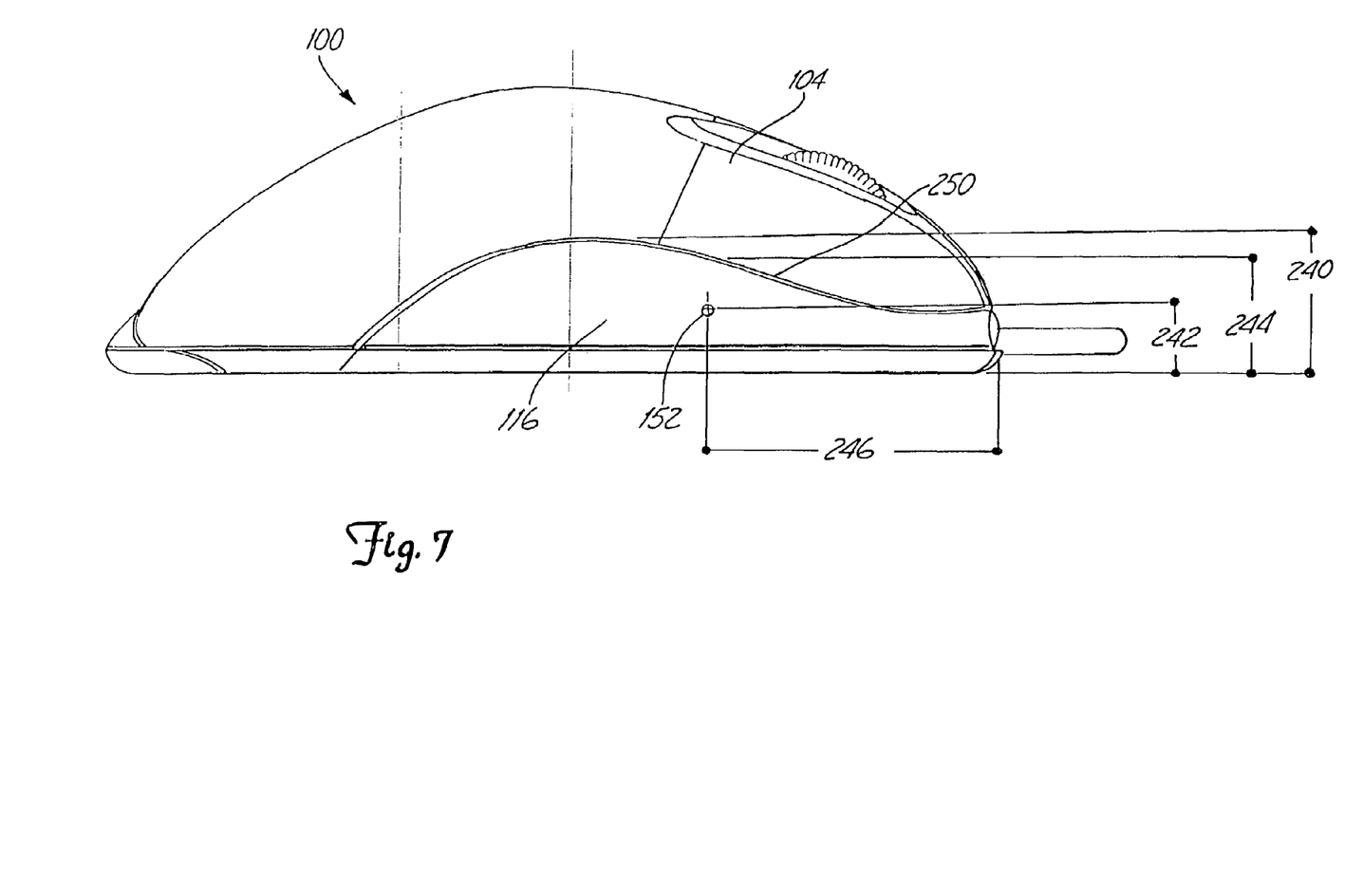
FIG. 7 is a second side view of a mouse of one embodiment of the present invention.

FIG. 7 provides a side view of mouse 100 showing support slope 116. Support slope 116 extends from a height 240 above the working surface to the working surface. In one embodiment, height 240 is about 0.75 inches (1.91 cm). Contact point 152 in support slope 116 is located a height 242 from the working surface and is located a distance 246 from the front of mouse 100. In one embodiment height 242 and distance 246 are about 0.38 inches (0.97 cm), and about 1.5 inches (3.81 cm), respectively.

Contact point 152 is located on support slope 116 so that the respective distal phalanges of the ring finger and little finger of the user are supported by the slope while at the same time, the side of the distal phalanx of the user's little finger can contact the working surface. Support slope 116 eliminates dragging of ring and little fingers across working surface, improving manipulation of the mouse 100. The width of the support slope 116 allows the user to register, if desired, with the working surface using their little finger to obtain tactile information about the amount by which the mouse is moving. It also gives the user more control in determining the speed at which the mouse moves.

The position of the contact point is also chosen so that the ring finger does not interfere with the actuation of secondary button 104. In particular, contact point 152 is positioned far enough below ridge line 250 of secondary button 104 that the user's ring finger does not contact button 104. In one embodiment, ridge line 250 is at a height 244 of about 0.66 inches (1.68 cm), which places the ridge line about 0.28 inches (0.71 cm) above contact point 152.

Figure 8:
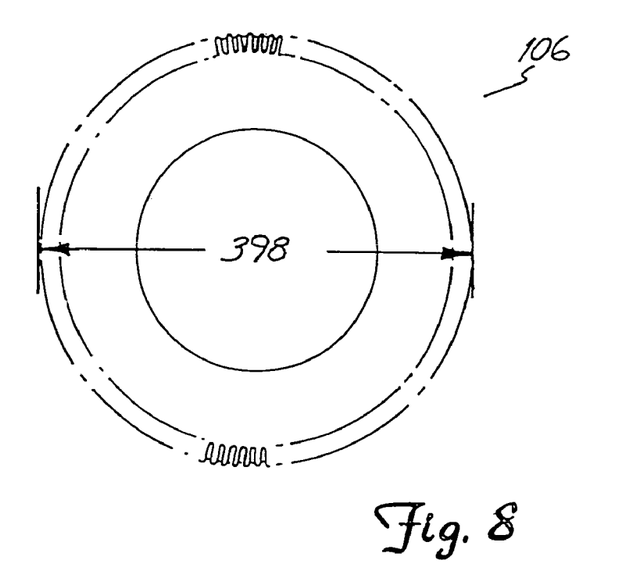
FIG. 8 is a side view of a wheel of one embodiment of the present invention in isolation.

FIG. 8 is a side view of wheel 106 in isolation. In one embodiment, wheel 106 has an outside diameter 398 of about 0.8 inch (2.03 cm) to about 1.2 inch (3.05 cm), and in one embodiment is about 1.0 inch (2.54 cm). The outer circumference has a surface consisting of a series of ribs or rounded ridges. In one embodiment, there are 120 ribs around the circumference of wheel 106, with the centers of the ribs separated by three degrees.

Figure 9:
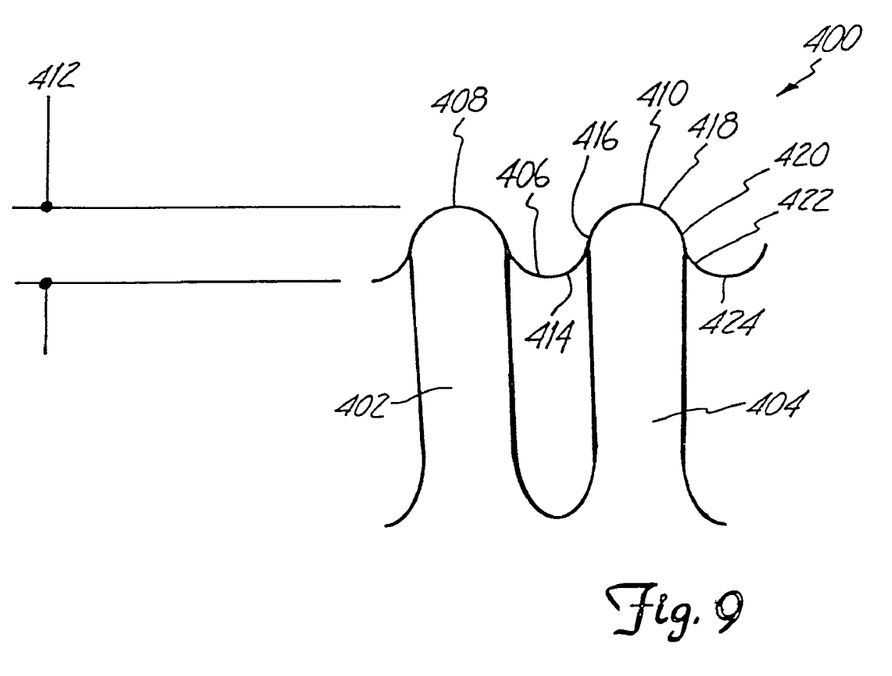
FIG. 9 is an enlarged side view of the wheel of FIG. 8 showing the ribs of the wheel.

FIG. 9 provides an enlarged side view of a section 400 of one embodiment of wheel 106 showing two ribs 402 and 404 in detail. Each rib extends from a center 406 to two respective peaks 408 and 410, giving each rib a height 412. In one embodiment height 412 is about 0.02 inch (0.05 cm).

The cross-sectional shape of each rib can be described with reference to the cross-sectional shape of rib 404, which is the combination of three contiguous curves. The first curve is a quarter-circle 414 that starts at center 406 and continues to a point 416 at half the height of rib 404. Quarter-circle 414 is based on a circle having a center located about 0.16 inch (0.41 cm) above center 406. The second curve is a half circle 418 extending from point 416 to a point 420 on the other side of rib 404 at a height equal to one-half the height of rib 404. Half-circle 418 is based on a circle having a center located 0.16 inch below peak 410. The third curve is another quarter-circle 422, which extends from point 420 to a neighboring center 424. Quarter-circle 422 is based on a circle having a center about 0.16 inch (0.41 cm) above neighboring center 424.

The ribs provided on wheel 106 increase friction between the wheel and the user's finger without creating a surface that feels uncomfortable to the user. In addition, because of the large number of ribs on the surface, the user's finger feels as if it is in contact with a uniform surface instead of a surface populated with widely spaced bumps or ridges as in the prior art. Thus, the number and size of the ribs of embodiments of the present invention provide increase friction making it easier to control wheel 106 and improved tactile sensations making the wheel more enjoyable to use.

Although only one rib shape is shown in FIG. 9, other rib shapes are within the scope of the invention and include shapes with more and less rounded peaks and shapes with more and less rounded troughs between the peaks.

Although embodiments of the present invention have been described with reference to a right-handed mouse, those skilled in the art will recognize that a left-handed mouse is within the spirit of the invention. Such a left-handed mouse of the present invention is a mirror image of the right-handed mouse described above.

Although the present invention has been described with reference to particular embodiments, workers skilled in the art will recognize that changes may be made in form and detail without departing from the spirit and scope of the invention.

What is claimed is:

1. A mouse input device for a computer system, the mouse capable of being moved across a working surface to move a displayed object on a computer display, the mouse comprising:

an upper casing having a highpoint;

a bottom surface designed to face the working surface;

a thumb pinching area located on a side of the mouse proximate the bottom surface;

a primary button;

a secondary button; and at least two side buttons located above the thumb pinching area on the side of the mouse in a direction away from the bottom surface such that the distance from the bottom surface to a position on the buttons closest to the bottom surface is at least thirty-six percent of the height of the mouse at the highpoint of the upper casing;

wherein the at least two side buttons comprise two outer surfaces and the upper casing comprises an outer surface, the outer surfaces of the at least two side buttons being substantially level with the outer surface of the upper casing at all points along a boundary between the at least two side buttons and the casing; and wherein the at least two side buttons together form a shaped button assembly that substantially conforms to a shape of a space between a user's thumb and a user's index finger when the user's thumb is positioned on the thumb pinching area and the user's index finger is positioned on the primary button.

2. The mouse of claim 1 wherein a user's thumb avoids contacting the at least two side buttons when the user's thumb rests in the thumb pinching area.

3. A mouse for a computer system, the mouse comprising:

a thumb gripping area located on a side of the mouse;

a primary button defining a portion of a top surface of the mouse; and at least two side buttons positioned on a side of the mouse between the top surface of the mouse and a bottom surface of the mouse, wherein the distance from the bottom surface of the mouse to a point on at least two side buttons that is closest to the bottom surface is greater than thirty-six percent the height of the mouse from the bottom surface to a highpoint on the top surface and wherein the thumb gripping area comprises a surface that is substantially level with a surface of the at least two side buttons along a boundary between the gripping area and the at least two side buttons, wherein the two side buttons together form a shaped button assembly that substantially conforms to the shape of a gap between a user's thumb and index finger when the user's thumb is located on the thumb gripping area and the user's index finger is positioned on the primary button.

4. The mouse of claim 3 wherein the user's thumb registers with a working surface over which the mouse moves when the user's thumb is located at the thumb gripping area.

5. The mouse of claim 4 wherein a space exists between the user's thumb and the at least two side buttons when the user's thumb is located at the thumb gripping area.

6. The mouse of claim 3 wherein the two side buttons comprise a forward button and a rear button, a majority of the forward button being closer to the front of the mouse than a majority of the rear button.

* * * * *

UNITED STATES PATENT AND TRADEMARK OFFICE
CERTIFICATE OF CORRECTION

| | | |
|---|---|---|
| PATENT NO. | : 7,345,674 B2 | Page 1 of 1 |
| APPLICATION NO. | : 11/134109 | |
| DATED | : March 18, 2008 | |
| INVENTOR(S) | : Hugh E. McLoone et al. | |

It is certified that error appears in the above-identified patent and that said Letters Patent is hereby corrected as shown below:

In column 8, line 32, in Claim 3, delete "f or" and insert --for--, therefor.

Signed and Sealed this
Twenty-second Day of February, 2011

David J. Kappos
*Director of the United States Patent and Trademark Office*